United States Patent
Jenny et al.

(10) Patent No.: US 7,496,488 B2
(45) Date of Patent: *Feb. 24, 2009

(54) MULTI-SCALE FINITE-VOLUME METHOD FOR USE IN SUBSURFACE FLOW SIMULATION

(75) Inventors: Patrick Jenny, Zurich (CH); Seong Lee, Emeryville, CA (US); Hamdi A. Tchelepi, San Mateo, CA (US)

(73) Assignees: Schlumberger Technology Company, Houston, TX (US); Chevron U.S.A. Inc., San Ramon, CA (US); ETH Zurich, Zurich (CH)

(*) Notice: Subject to any disclaimer, the term of this patent is extended or adjusted under 35 U.S.C. 154(b) by 44 days.

This patent is subject to a terminal disclaimer.

(21) Appl. No.: 10/997,539

(22) Filed: Nov. 23, 2004

(65) Prior Publication Data

US 2005/0203725 A1    Sep. 15, 2005

Related U.S. Application Data (63) Continuation-in-part of application No. 10/383,908, filed on Mar. 6, 2003, now Pat. No. 6,823,297.

(51) Int. Cl.
G06G 7/48 (2006.01)
G01V 3/38 (2006.01)
G01V 1/38 (2006.01)
G01V 1/00 (2006.01)

(52) U.S. Cl. .............................. 703/10; 702/5; 367/23; 367/56; 367/57

(58) Field of Classification Search ................. 703/10; 702/5; 367/23, 56, 57

See application file for complete search history.

(56) References Cited

U.S. PATENT DOCUMENTS 4,821,164 A * 4/1989 Swanson ........................ 702/5

(Continued)

FOREIGN PATENT DOCUMENTS

WO    WO 99/52048    10/1999

(Continued)

OTHER PUBLICATIONS

Chien et al., SPE 16025, The Use of Vectorization and Parallel Processing for Reservoir Simulation, SPE Society of Petroleum Engineers, 1987, pp. 329-341, Society of Petroleum Engineers.

(Continued)

*Primary Examiner*—Paul L Rodriguez
*Assistant Examiner*—Nithya Janakiraman
(74) *Attorney, Agent, or Firm*—Christopher D. Northcutt; Richard J. Schulte (57) ABSTRACT

A multi-scale finite-volume (MSFV) method to solve elliptic problems with a plurality of spatial scales arising from single or multi-phase flows in porous media is provided. The method efficiently captures the effects of small scales on a coarse grid, is conservative, and treats tensor permeabilities correctly. The underlying idea is to construct transmissibilities that capture the local properties of a differential operator. This leads to a multi-point discretization scheme for a finite-volume solution algorithm. Transmissibilities for the MSFV method are preferably constructed only once as a preprocessing step and can be computed locally.

13 Claims, 10 Drawing Sheets

U.S. PATENT DOCUMENTS

| | | | |
|---|---|---|---|
| 5,663,928 A * | 9/1997 | De Bazelaire et al. | 367/52 |
| 6,106,561 A * | 8/2000 | Farmer | 703/10 |
| 6,266,619 B1 | 7/2001 | Thomas et al. | |
| 6,631,202 B2 | 10/2003 | Hale | |
| 2002/0013887 A1 | 1/2002 | Ortoleva | |
| 2003/0028325 A1 | 2/2003 | Roggero et al. | |
| 2003/0078733 A1 | 4/2003 | Stone | |
| 2005/0273303 A1 * | 12/2005 | Flandrin et al. | 703/10 |
| 2006/0277012 A1 * | 12/2006 | Ricard et al. | 703/10 |

FOREIGN PATENT DOCUMENTS

| | | |
|---|---|---|
| WO | WO 99/57418 | 11/1999 |
| WO | WO 00/79423 A1 | 12/2000 |
| WO | WO 01/06091 A1 | 1/2001 |
| WO | WO 01/27755 A1 | 4/2001 |
| WO | WO 01/27858 A1 | 4/2001 |
| WO | WO 02/06857 A1 | 1/2002 |

OTHER PUBLICATIONS

Durlofsky, Numerical Calculation of Equivalent Grid Block Permeability Tensors for Heterogeneous Porous Media, Water Resources Research, May 1991, pp. 699-708, vol. 27, No. 5, Paper No. 91WR00107, American Geophysical Union.

Durlofsky et al., A nonuniform coarsening approach for the scale-up of displacement processes in heterogeneous porous media, Advances in Water Resources, 1997, pp. 335-347, vol. 20, Nos. 5-6, Elsevier Science Ltd.

Hou et al., A Multiscale Finite Element Method for Elliptic Problems in Composite Materials and Porous Media, Journal of Computational Physics, (1997), pp. 169-189, 134, Article No. CP975682, Academic Press.

Lee et al., Finite Difference Simulation of Geologically Complex Reservoirs with Tensor Permeabilities, SPE Reservoir Evaluation & Engineering, Dec. 1998, pp. 567-574, Society of Petroleum Engineers.

Lee et al., SPE 51901, Implementation of a Flux-Continuous Finite Difference Method for Stratigraphic, Hexahedron Grids, pp. 1-11, Society of Petroleum Engineers, Inc., Feb. 14-17, 1999.

Wallstrom et al., SPE 51939, Application of a New Two-Phase Upscaling Technique to Realistic Reservoir Cross Sections, SPE International Society of Petroleum Engineers, 1999, pp. 451-462, Society of Petroleum Engineers, Inc.

Arbogast, Numerical Subgrid Upscaling of Two-Phase Flow in Porous Media, Technical Report, Texas Institute for Computational and Applied Mathematics, The University of Texas at Austin, Department of Mathematics, 2000, pp. 35-49, Springer.

Efendiev et al., Convergence of a Nonconforming Multiscale Finite Element Method, SIAM Journal of Numerical Analysis, Feb. 2000 to Mar. 2000, pp. 888-910, vol. 37, No. 3, Society for Industrial and Applied Mathematics.

Arbogast et al., SPE 66375, Numerical Subgrid Upscaling for Waterflood Simulations, SPE International Society of Petroleum Engineers, 2001, pp. 1-14, Society of Petroleum Engineers, Inc.

Christie et al., SPE 66599, Tenth SPE Comparative Solution Project: A Comparison of Upscaling Techniques, SPE International Society of Petroleum Engineers 2001, pp. 1-13, Society of Petroleum Engineers, Inc.

Jenny et al., SPE 66357, Modeling Flow in Geometrically Complex Reservoirs Using Hexahedral Multi-block Grids, SPE International Society of Petroleum Engineers, 2001, pp. 1-10, Society of Petroleum Engineers Inc.

Efendiev et al., Multiscale finite element for problems with highly oscillatory coefficients, Numerische Mathematik, pp. 459-486, 90, Digital Object Identifier (DOI) 10.1007/s002110100274, Jun. 7, 2001.

Chen et al., A Mixed Multiscale Finite Element Method for Elliptic Problems with Oscillating Coefficients, Mathematics of Computation, Jun. 2002, pp. 541-576, vol. 72, No. 242, S 0025-5718(02)01441-2, American Mathematical Society.

\* cited by examiner

MULTI-SCALE FINITE-VOLUME METHOD FOR USE IN SUBSURFACE FLOW SIMULATION

RELATED APPLICATIONS

This application is a continuation-in-part of co-pending U.S. patent application Ser. No. 10/383,908, entitled "Multi-Scale Finite-Volume Method for Use in Subsurface Flow Simulation", filed on Mar. 6, 2003 and is a continuation-in-part of co-pending application entitled "Multi-Scale Finite-Volume Method for Use in Subsurface Flow Simulation", filed on Sep. 22, 2004, which is a continuation of co-pending U.S. patent application Ser. No. 10/383,908, entitled "Multi-Scale Finite-Volume Method for Use in Subsurface Flow Simulation", filed on Mar. 6, 2003.

TECHNICAL FIELD

The present invention relates generally to subsurface reservoir simulators, and more particularly, to those simulators which use multi-scale physics to simulate flow in an underground reservoir.

BACKGROUND OF THE INVENTION

The level of detail available in reservoir description often exceeds the computational capability of existing reservoir simulators. This resolution gap is usually tackled by upscaling the fine-scale description to sizes that can be treated by a full-featured simulator. In upscaling, the original model is coarsened using a computationally inexpensive process. In flow-based methods, the process is based on single-phase flow. A simulation study is then performed using the coarsened model. Upscaling methods such as these have proven to be quite successful. However, it is not possible to have a prior estimate of the errors that are present when complex flow processes are investigated using coarse models constructed via these simplified settings.

Various fundamentally different multi-scale approaches for flow in porous media have been proposed to accommodate the fine-scale description directly. As opposed to upscaling, the multi-scale approach targets the full problem with the original resolution. The upscaling methodology is typically based on resolving the length and time-scales of interest by maximizing local operations. Arbogast et al. (T. Arbogast, *Numerical subgrid upscaling of two phase flow in porous media*, Technical report, Texas Institute for Computational and Applied Mathematics, The University of Texas at Austin, 1999, and T. Arbogast and S. L. Bryant, *Numerical subgrid upscaling for waterflood simulations*, SPE 66375, 2001) presented a mixed finite-element method where fine-scale effects are localized by a boundary condition assumption at the coarse element boundaries. Then the small-scale influence is coupled with the coarse-scale effects by numerical Greens functions. Hou and Wu (T. Hou and X. H. Wu, *A multiscale finite element method for elliptic problems in composite materials and porous media*, J. Comp. Phys., 134:169-189, 1997) employed a finite-element approach and constructed specific basis functions which capture the small scales. Again, localization is achieved by boundary condition assumptions for the coarse elements. To reduce the effects of these boundary conditions, an oversampling technique can be applied. Chen and Hou (Z. Chen and T. Y. Hou, *A mixed finite element method for elliptic problems with rapidly oscillating coefficients*, Math. Comput., June 2002) utilized these ideas in combination with a mixed finite-element approach. Another approach by Beckie et al. (R. Beckie, A. A. Aldama, and E. F. Wood, *Modeling the large-scale dynamics of saturated groundwater flow using spatial filtering*, Water Resources Research, 32:1269-1280, 1996) is based on large eddy simulation (LES) techniques which are commonly used for turbulence modeling.

Lee et al. (S. H. Lee, L. J. Durlofsky, M. F. Lough, and W. H. Chen, *Finite difference simulation of geologically complex reservoirs with tensor permeabilities*, SPERE&E, pages 567-574, 1998) developed a flux-continuous finite-difference (FCFD) scheme for 2D models. Lee et al. further developed a method to address 3D models (S. H. Lee, H. Tchelepi, P. Jenny and L. Dechant, *Implementation of a flux continuous finite-difference method for stratigraphic, hexahedron grids*, SPE Journal, September, pages 269-277, 2002). Jenny et al. (P. Jenny, C. Wolfsteiner, S. H. Lee and L. J. Durlofsky, *Modeling flow in geometrically complex reservoirs using hexahedral multi-block grids*, SPE Journal, June, pages 149-157, 2002) later implemented this scheme in a multi-block simulator.

In light of the above modeling efforts, there is a need for a simulation method which more efficiently captures the effects of small scales on a coarse grid. Ideally, the method would be conservative and also treat tensor permeabilities correctly. Further, preferably the reconstructed fine-scale solution would satisfy the proper mass balance on the fine-scale. The present invention provides such a simulation method.

SUMMARY OF THE INVENTION

A multi-scale finite-volume (MSFV) approach is taught for solving elliptic or parabolic problems such as those found in subsurface flow simulators. Advantages of the present MSFV method are that it fits nicely into a finite-volume framework, it allows for computing effective coarse-scale transmissibilities, treats tensor permeabilities properly, and is conservative at both the coarse and fine-scales. The present method is computationally efficient relative to reservoir simulation now in use and is well suited for massive parallel computation. The present invention can be applied to 3D unstructured grids and also to multi-phase flow. Further, the reconstructed fine-scale solution satisfies the proper mass balance on the fine-scale.

A multi-scale approach is described which results in effective transmissibilities for the coarse-scale problem. Once the transmissibilities are constructed, the MSFV method uses a finite-volume scheme employing multi-point stencils for flux discretization. The approach is conservative and treats tensor permeabilities correctly. This method is easily applied using existing finite-volume codes, and once the transmissibilities are computed, the method is computationally very efficient. In computing the effective transmissibilities, closure assumptions are employed.

A significant characteristic of the present multi-scale method is that two sets of basis functions are employed. A first set of dual basis functions is computed to construct transmissibilities between coarse cells. A second set of locally computed fine-scale basis functions is utilized to reconstruct a fine-scale velocity field from a coarse scale solution. This second set of fine-scale basis functions is designed such that the reconstructed fine-scale velocity solution is fully consistent with the transmissibilities. Further, the solution satisfies the proper mass balance on the small scale.

The MSFV method may be used in modeling a subsurface reservoir. A fine grid is first created defining a plurality of fine cells. A permeability field and other fine-scale properties are associated with the fine cells. Next, a coarse grid is created which defines a plurality of coarse cells having interfaces between the coarse cells. The coarse cells are ideally aggregates of the fine cells. A dual coarse grid is constructed defining a plurality of dual coarse control volumes. The dual coarse control volumes are ideally also aggregates of the fine cells. Boundaries surround the dual coarse control volumes.

Dual basis functions are then calculated on the dual coarse control volumes by solving local elliptic or parabolic problems, preferably using boundary conditions obtained from solving reduced problems along the interfaces of the course cells. Fluxes, preferably integral fluxes, are then extracted across the interfaces of the coarse cells from the dual basis functions. These fluxes are assembled to obtain effective transmissibilities between coarse cells of the coarse cell grid. The transmissibilities can be used for coarse scale finite volume calculations.

A fine-scale velocity field may be established. A finite volume method is used to calculate pressures in the coarse cells utilizing the transmissibilities between cells. Fine-scale basis functions are computed by solving local elliptic or parabolic flow problems on the coarse cells and by utilizing fine-scale fluxes across the interfaces of the coarse cells which are extracted from the dual basis functions. Finally, the fine-scale basis functions and the corresponding coarse cell pressures are combined to extract the fine-scale velocity field.

A transport problem may be solved on the fine grid by using the fine-scale velocity field. Ideally, the transport problem is solved iteratively in two stages. In the first stage, a fine-scale velocity field is obtained from solving a pressure equation. In the second stage, the transport problem is solved on the fine cells using the fine-scale velocity field. A Schwartz overlap technique can be applied to solve the transport problem locally on each coarse cell with an implicit upwind scheme.

A solution may be computed on the coarse cells at an incremental time and properties, such as a mobility coefficient, may be generated for the fine cells at the incremental time. If a predetermined condition is not met for all fine cells inside a dual coarse control volume, then the dual and fine-scale basis functions in that dual coarse control volume are reconstructed.

BRIEF DESCRIPTION OF THE DRAWINGS

These and other objects, features and advantages of the present invention will become better understood with regard to the following description, pending claims and accompanying drawings where:

BEST MODES FOR CARRYING OUT THE INVENTION

I. Flow Problem

A. One Phase Flow

Fluid flow in a porous media can be described by the elliptic problem:

$$\nabla \cdot (\lambda \cdot \nabla p) = f \text{ on } \Omega \tag{1}$$

where p is the pressure, $\lambda$ is the mobility coefficient (permeability, K, divided by fluid viscosity, $\mu$) and $\Omega$ is a volume or region of a subsurface which is to be simulated. A source term f represents wells, and in the compressible case, time derivatives. Permeability heterogeneity is a dominant factor in dictating the flow behavior in natural porous formations. The heterogeneity of permeability K is usually represented as a complex multi-scale function of space. Moreover, permeability K tends to be a highly discontinuous full tensor. Resolving the spatial correlation structures and capturing the variability of permeability requires a highly detailed reservoir description.

The velocity u of fluid flow is related to the pressure field through Darcy's law:

$$u = -\lambda \cdot \nabla p. \tag{2}$$

On the boundary of a volume, $\partial\Omega$, the flux $q = u \cdot v$ is specified, where $v$ is the boundary unit normal vector pointing outward. Equations (1) and (2) describe incompressible flow in a porous media. These equations apply for both single and multi-phase flows when appropriate interpretations of the mobility coefficient $\lambda$ and velocity u are made. This elliptic problem is a simple, yet representative, description of the type of systems that should be handled efficiently by a subsurface flow simulator. Moreover, the ability to handle this limiting case of incompressible flow ensures that compressible systems can be treated as a subset.

B. Two Phase Flow

The flow of two incompressible phases in a heterogeneous domain may be mathematically described by the following:

$$\Phi \frac{\partial S_o}{\partial t} - \frac{\partial}{\partial x_i}\left(k\frac{k_{r_o}}{\mu_o}\frac{\partial p}{\partial x_i}\right) = -q_o \quad (3)$$

$$\Phi \frac{\partial S_w}{\partial t} - \frac{\partial}{\partial x_i}\left(k\frac{k_{r_w}}{\mu_w}\frac{\partial p}{\partial x_i}\right) = -q_w$$

on a volume Ω, where p is the pressure, $S_{o,w}$ are the saturations (the subscripts o and w stand for oil and water, respectively) with $0 \leq S_{o,w} \leq 1$ and $S_o + S_w \equiv 1$, k is the heterogeneous permeability, $k_{r_{o,w}}$ are the relative permeabilities (which are functions of $S_{o,w}$), $\mu_{o,w}$ the viscosities and $q_{o,w}$ are source terms which represent the wells. The system assumes that capillary pressure and gravity are negligible. Equivalently, system (3) can be written as:

$$-\nabla \cdot u = q_o + q_w \quad (4)$$

$$\Phi \frac{\partial S_o}{\partial t} + \nabla \cdot \left(\frac{k_o}{k_o + k_w}u\right) = -q_o \quad (5)$$

on Ω with $$u = -\lambda \nabla p. \quad (6)$$

and the total mobility $$\lambda = k(k_o + k_w), \quad (7)$$

where $k_j \equiv k_{r_j}/\mu_j$ for $j \in \{o,w\}$.

Equation (4) is known as the "pressure equation" and equation (5) as the "hyperbolic transport equation." Again, equations (4) and (5) are a representative description of the type of systems that should be handled efficiently by a subsurface flow simulator. Such flow simulators, and techniques employed to simulate flow, are well known to those skilled in the art and are described in publications such as *Petroleum Reservoir Simulation*, K. Aziz and A. Settari, Stanford Bookstore Custom Publishing, 1999.

II. Multi-Scale Finite-Volume (MSFV) Method

A. MSFV Method for One Phase Flow

1. Finite-Volume Method

A cell centered finite-volume method will now be briefly described. To solve the problem of equation (1), the overall domain or volume Ω is partitioned into smaller volumes $\{\overline{\Omega}_i\}$. A finite-volume solution then satisfies $$\int_{\overline{\Omega}_i} \nabla \cdot u \, d\Omega = \int_{\partial \overline{\Omega}_i} u \cdot \overline{v} \, d\Gamma = -\int_{\overline{\Omega}_i} f \, d\Omega \quad (8)$$

for each control volume $\overline{\Omega}_i$, where $\overline{v}$ is the unit normal vector of the volume boundary $\partial \overline{\Omega}_i$ pointing outward. The challenge is to find a good approximation for $u \cdot \overline{v}$ at $\partial \overline{\Omega}_i$. In general, the flux is expressed as:

$$u \cdot \overline{v} = \sum_{k=1}^{n} T^k \overline{p}^k. \quad (9)$$

Equation (9) is a linear combination of the pressure values, $\overline{p}_i$ in the volumes $\{\overline{\Omega}_i\}$ of the domain Ω. The total number of volumes is n and $T^k$ denotes transmissibility between volumes $\{\overline{\Omega}_i\}$. By definition, the fluxes of equation (9) are continuous across the interfaces of the volumes $\{\overline{\Omega}_i\}$ and, as a result, the finite-volume method is conservative.

2. Construction of the Effective Transmissibilities

Figure 1:
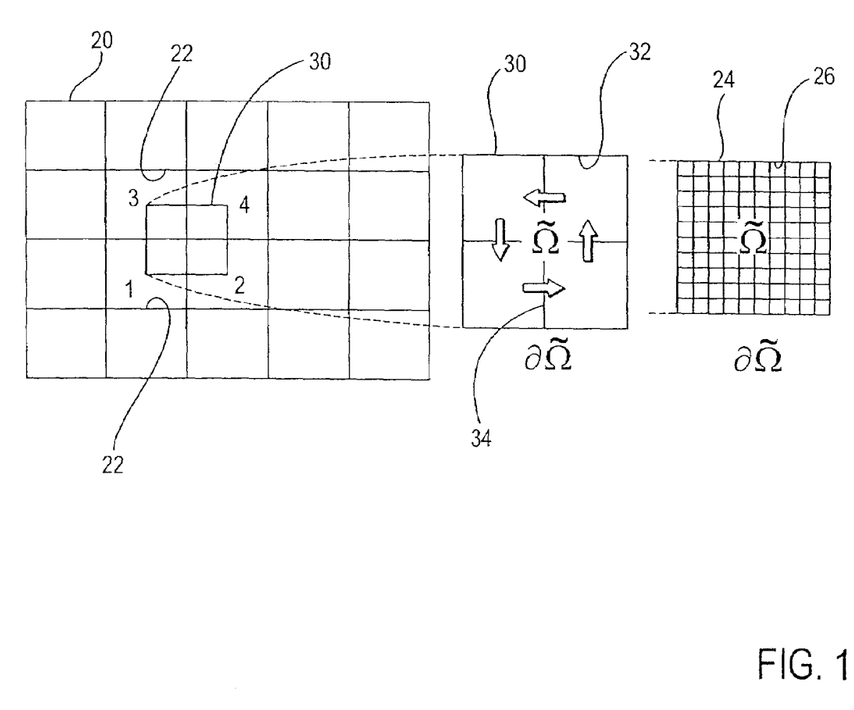
FIG. 1 illustrates a coarse 2D grid of coarse cells with an overlying dual coarse grid including a dual coarse control volume and an underlying fine grid of fine cells.

The MSFV method results in multi-point stencils for coarse-scale fluxes. For the following description, an orthogonal 2D grid 20 of grid cells 22 is used, as shown in FIG. 1. An underlying fine grid 24 of fine grid cells 26 contains the fine-scale permeability K information. To compute the transmissibilities T between coarse grid cells 22, a dual coarse grid 30 of dual coarse control volumes 32 is used. A control volume 32 of the dual grid 30, $\tilde{\Omega}$, is constructed by connecting the mid-points of four adjacent coarse grid cells 22. To relate the fluxes across the coarse grid cell interfaces 34 which lie inside a particular control volume 32, or $\tilde{\Omega}$, to the finite-volume pressures $\overline{p}^k$(k=1,4) in the four adjacent coarse grid cells 22, a local elliptical problem in the preferred embodiment is defined as $$\nabla \cdot (\lambda \cdot \nabla p) = 0 \text{ on } \tilde{\Omega}. \quad (10)$$

For one skilled in the art, the method can easily be adapted to use a local parabolic problem.

For an elliptic problem, Dirichlet or Neumann boundary conditions are to be specified on boundary ∂$\tilde{\Omega}$. Ideally, the imposed boundary conditions should approximate the true flow conditions experienced by the sub-domain in the full system. These boundary conditions can be time and flow dependent. Since the sub-domain is embedded in the whole system, Wallstrom et al. (T. C. Wallstrom, T. Y. Hou, M. A. Christie, L. J. Durlofsky, and D. H. Sharp, *Application of a new two-phase upscaling technique to realistic reservoir cross sections*, SPE 51939, presented at the SPE Symposium on Reservoir Simulation, Houston, 1999) found that a constant pressure condition at the sub-domain boundary tends to overestimate flow contributions from high permeability areas. If the correlation length of permeability is not much larger than the grid size, the flow contribution from high permeability areas is not proportional to the nominal permeability ratio. The transmissibility between two cells is a harmonic mean that is closer to the lower permeability. As a result, uniform flux conditions along the boundary often yield much better numerical results for a sub-domain problem than linear or constant pressure conditions.

Figure 2:
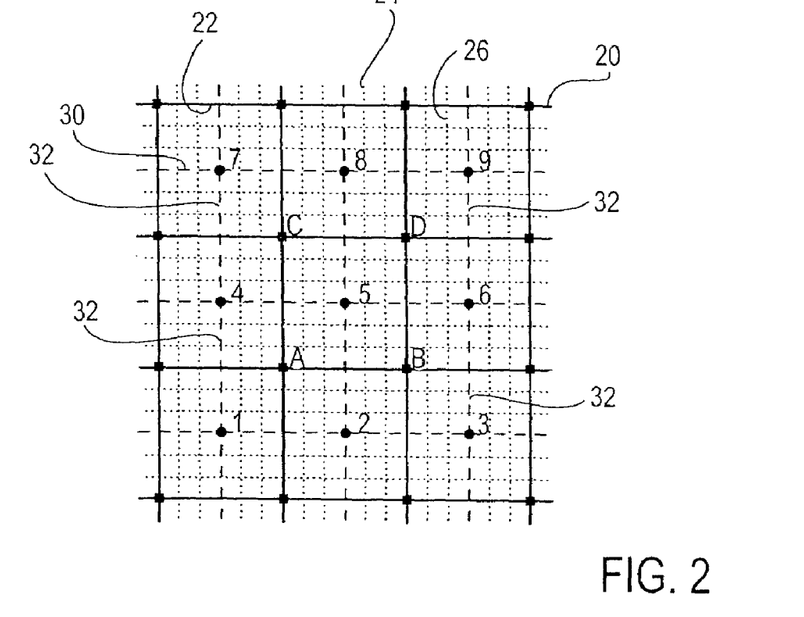
FIG. 2 illustrates a coarse grid including nine adjacent coarse cells (bold solid lines) with a corresponding overlying dual coarse grid (bold dashed lines) including dual coarse control volumes and an underlying fine grid (thin dotted lines) of fine cells.

Hou and Wu (T. Hou and W. H. Wu, *A multiscale finite element method for elliptic problems in composite materials and porous media*, J. Comp. Phys., 134:169-189, 1997) also proposed solving a reduced problem $$\frac{\partial}{\partial x_t}\left(\lambda_{ij}\frac{\partial p}{\partial x_j}\right)_t = 0, \quad (11)$$

to specify the boundary conditions for the local problem. The subscript t denotes the component parallel to the boundary of the dual coarse control volume 32 or ∂$\tilde{\Omega}$. For equation (11) and for the following part of this specification, Einstein summation convention will be used. The elliptic problem on a control volume $\tilde{\Omega}$ with boundary conditions of equation (11) on ∂$\tilde{\Omega}$ can be solved by any appropriate numerical method. In order to obtain a pressure solution that depends linearly on the pressures $\overline{p}^k$(j=1,4), this preferred embodiment solves four elliptic problems, one for each cell-center pressure. For instance, to get the solution for the pressure $\bar{p}^1$ in the coarse grid cell having node 1 at its center, $\bar{p}^k = \delta_{1k}$ is set. The four solutions provide the dual basis functions $\tilde{\Phi}^k (k=1,4)$ in control volume $\tilde{\Omega}$, and the pressure solution of the local elliptic problem in a control volume $\tilde{\Omega}$ is the linear combination $$p = \sum_{k=1}^{4} \bar{p}^k \tilde{\Phi}^k. \tag{12}$$

Accordingly, the flux q across the grid cell interfaces can be written as a linear combination $$q = \sum_{k=1}^{4} \bar{p}^k q^k, \tag{13}$$

where $q^k(k=1,4)$ are the flux contributions from the corresponding dual basis functions, given all $\tilde{\Phi}^k(k=1,4)$ from all control volumes $\tilde{\Omega}$. The effective transmissibilities T are computed, which can be used for finite-volume simulations, by assembling the flux contributions, in the preferred embodiment integral flux contributions across the cell interfaces 34.

Note that the domain $\tilde{\Omega}$ can have any fine-scale distribution of mobility coefficients $\lambda$. Of course the boundary condition given by equation (11) is an approximation that allows one to decouple the local problems. The MSFV and global fine-scale solutions are identical, only if equation (11) happens to capture the exact fine-scale pressure solution. However, numerical experiments have been performed which indicate that equation (11) is an excellent approximation of the boundary condition.

Although the MSFV approach is a finite-volume method, it resembles the multi-scale finite-element method of Wu and Hou, briefly mentioned above. The construction of the dual basis functions is similar, though in the present MSFV method they are represented on the dual coarse grid rather than on the boundary of a finite element. A significant difference is that the present MSFV method is a cell-centered finite-volume method and is conservative. On the other hand, the mass matrix in the multi-scale finite-element method is constructed based on a variational principle and does not ensure local conservation. In the next section, the importance is illustrated of a fine-scale velocity field that is conservative.

3. Reconstruction of a Conservative Fine-Scale Velocity Field

Fluxes across the coarse cell interfaces 34 can be accurately computed by multi-scale transmissibilities T. In some cases, it is interesting to accurately represent the small-scale velocities u (e.g., to predict the distribution of solute transported by a fluid). A straightforward approach might appear to be to use the dual basis functions $\Phi$ of equation (12). However, then the reconstructed fine-scale velocity field is, in general, discontinuous at the cell interfaces of the dual grid 30. Therefore, large errors can occur in the divergence field, and local mass balance is violated. Note that mass conservation is always satisfied for the coarse solution using the present MSFV method.

The construction of a second set of local fine-scale basis functions $\Phi$ will now be described which is fully consistent with the fluxes q across the cell interfaces given by the dual basis functions $\tilde{\Phi}$. This second set of fine-scale basis functions $\Phi$ allows a conservative fine-scale velocity field to be reconstructed.

FIG. 2 shows a coarse grid 20 with nine adjacent grid cells 22 and a corresponding dual grid 30 of dual coarse control volumes 32 or $\tilde{\Omega}$. For indexing purposes, these particular cells and corresponding dual volumes shall now be identified with numerals "1-9" and letters "A-D" at their respective centers. Also shown is the underlying fine grid 24 of fine grid cells 26. The coarse grid, having the nine adjacent coarse cells 1-9, is shown in bold solid lines. The corresponding dual grid 30 of dual coarse control volumes A-D are depicted with bold dashed lines. The underlying fine grid 24 of fine grid cells is shown with thin dotted lines.

To explain the reconstruction of the fine-scale velocity, the mass balance of the center grid cell 5 is examined. The coarse scale pressure solution, together with the dual basis functions $\Phi$, provides the fine-scale fluxes q across the interfaces of coarse cell 5.

Figure 3:
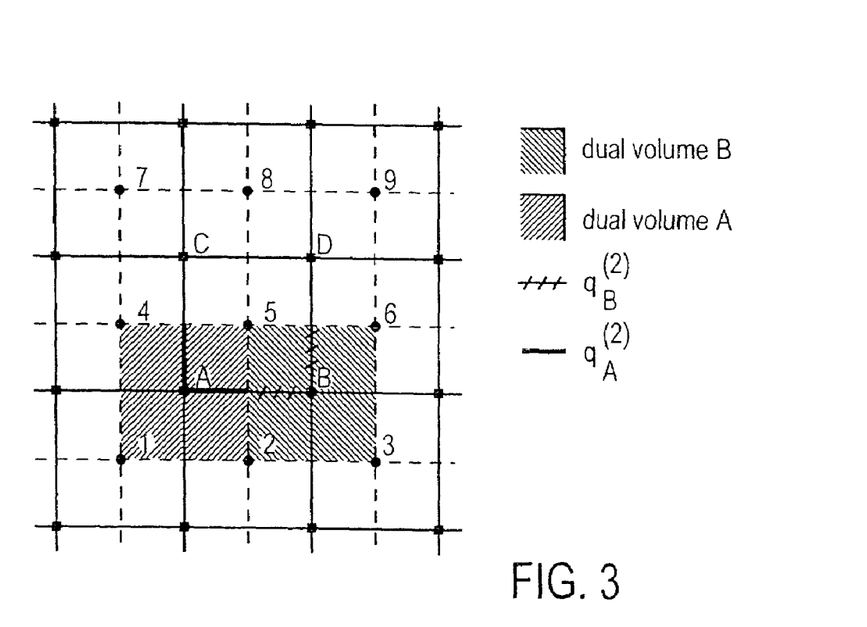
FIG. 3 shows flux contribution $q_A^{(2)}$ and $q_B^{(2)}$ due to the pressure in a particular coarse cell 2.

To obtain a proper representation of the fine-scale velocity field in coarse cell 5, (i) the fine-scale fluxes across an interface of coarse cell 5 must match, and (ii) the divergence of the fine-scale velocity field within the coarse volume satisfies $$\nabla \cdot u = \frac{\int_{\partial \bar{\Omega}_5} q \, d\Gamma}{\int_{\bar{\Omega}_5} d\Omega}, \tag{14}$$

where $\bar{\Omega}_5$ is the coarse grid cell 5. The fine-scale flux q across the boundary of grid cell 5 depends on the coarse pressure solutions in grid cells 1-9. Therefore, the fine-scale velocity field within coarse grid cell 5 can be expressed as a superposition of fine-scale basis functions $\Phi^i(i=1,9)$. With the help of FIG. 3, which depicts the needed dual coarse control volumes, the needed dual coarse control volumes, the construction the needed dual coarse control volumes, the construction of the fine-scale the needed dual coarse control volumes, the construction of the fine-scale the needed dual coarse control volumes, the construction of the fine-scaletion in construction of the fine-scale basis functions $\Phi^i$ will be described. Each coarse cell pressure $\bar{p}(i=1,9)$ contributes to the fine-scale flux q. For example, let the contribution of the pressure in cell 2 to the flux q in grid cell 5 be $q^{(2)}$. Note that $q^{(2)}$ is composed of contributions $q_A^{(2)}$ and $q_B^{(2)}$ coming from the dual basis functions associated with node 2 of volume A and volume B, respectively. To compute the fine-scale basis function $\Phi^i$ associated with the pressure in a coarse cell i, $\bar{p}^j = \delta_{ij}$ is set, and the pressure field is constructed according to the following equation.

$$p = \sum_{k \in \{A,B,C,D\}} \sum_{j=1}^{9} \bar{p}^j \tilde{\Phi}_k^j. \tag{15}$$

The fine-scale fluxes q are computed from the pressure field. These fluxes provide the proper boundary condition for computing the fine-scale basis function $\Phi^i$. To solve the elliptic problem $$\nabla \cdot (\lambda \cdot \nabla p) = f' \text{ on } \bar{\Omega}_5 \tag{16}$$

with the boundary conditions described above, solvability must be ensured. This is achieved by setting $$f' = \frac{\int_{\partial\Omega_5} q \, d\Gamma}{\int_{\Omega_5} d\Omega}, \quad (17)$$

which is an equally distributed source term within $\overline{\Omega}_5$. Finally, the solution of the elliptic problem, (16) and (17), is the fine-scale basis function $\Phi^i$ for coarse cell 5 associated with the pressure in volume i. The small-scale velocity field is extracted from the superposition $$p = \sum_{j=1}^{9} \overline{p}^j \Phi_5^j. \quad (18)$$

For incompressible flow, this velocity field is divergence free everywhere. Computing the fine-scale basis functions (i requires solving nine small elliptic problems, which are of the same size as those for the transmissibility calculations. Note that this step is a preprocessing step and has to be done only once. Furthermore, the construction of the fine-scale basis functions $\Phi^i$ is independent and therefore well suited for parallel computation. The reconstruction of the fine-scale velocity field is a simple superposition and is ideally performed only in regions of interest.

Alternatively, a conservative fine-scale velocity field may also be constructed directly in place. This construction may be performed as follows: (i) compute the fine-scale fluxes across the coarse cell interfaces using the dual basis functions with the pressures for the coarse cells; (ii) solve a pressure equation on each of the coarse cells using the fine-scale fluxes computed in step (i) as boundary conditions to obtain fine-scale pressures; (iii) compute the fine-scale velocity field from Darcy's law using the fine-scale pressures obtained in step (ii) with the underlying fine-scale permeability. The pressure solution of step (ii) may be performed on a system with larger support (e.g., by over-sampling around the coarse cell).

III. Implementation of the MSFV Method

Figure 4:
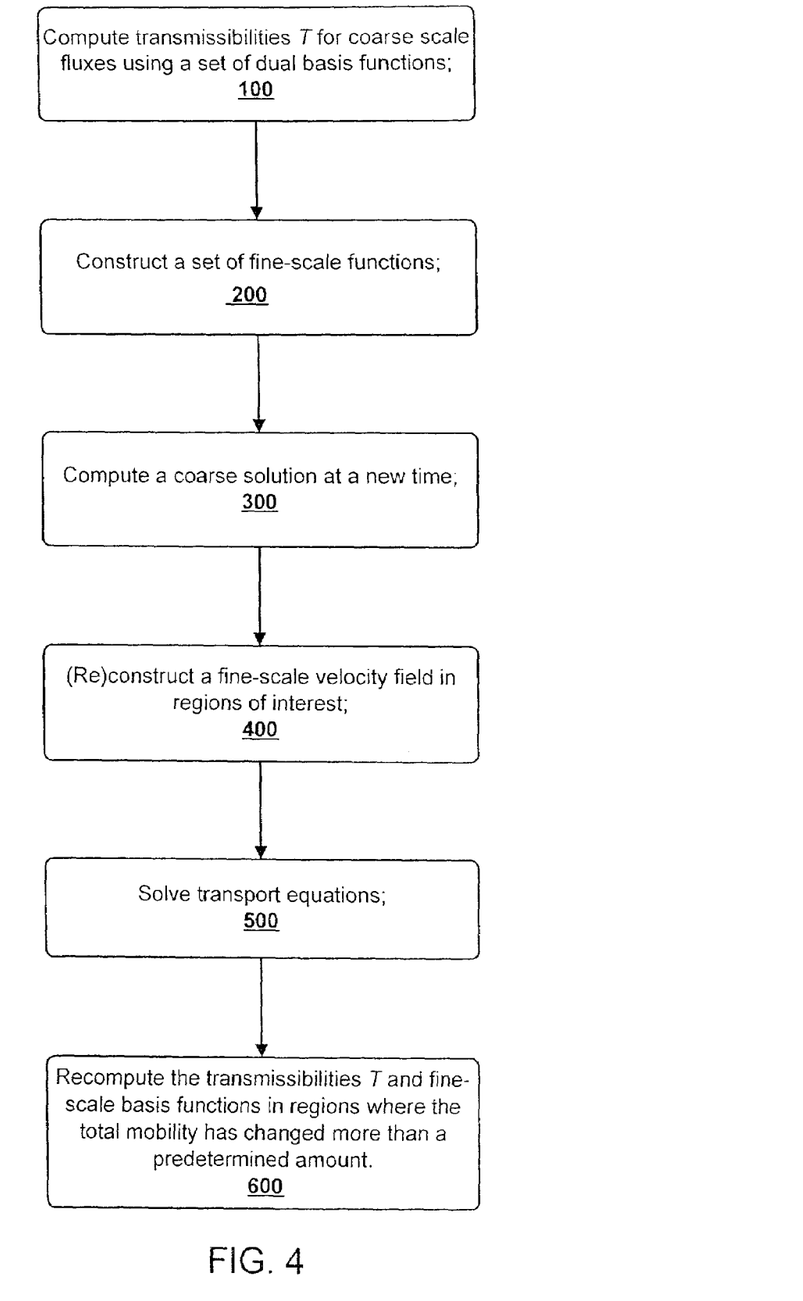
FIG. 4 is a flowchart describing the overall steps used in a preferred embodiment of a reservoir simulation which employs a multi-scale finite-volume (MSFV) method made in accordance with this invention.

FIG. 4 is a flow chart summarizing the steps employed in a preferred embodiment in simulating a reservoir using the MSFV algorithm of this invention. The MSFV algorithm consists of six major steps:

A. compute transmissibilities T for coarse-scale fluxes (step 100);

B. construct fine-scale basis functions (step 200);

C. compute a coarse solution at a new time level; (step 300);

D. reconstructs the fine-scale velocity field in regions of interest (step 400);

E. solve transport equations (step 500); and

F. recomputes transmissibilities and also the fine-scale basis functions in regions where the total mobility has changed more than a predetermined amount (step 600).

Steps A-D describes a two-scale approach. The methodology can be applied recursively with successive levels of coarsening. In cases of extremely fine resolution, this multilevel approach should yield scalable solutions. Parts E and F account for transport and mobility changes due to evolving phases and will be described in more detail below.

A. Computing Transmissibilities for Coarse-Scale Fluxes—Step 100

The transmissibility calculations can be done in a stand alone module (T-module) and are well suited for parallel computation. The transmissibilities T can be written to a file for use by any finite-volume simulator that can handle multipoint flux discretization.

Figure 5:
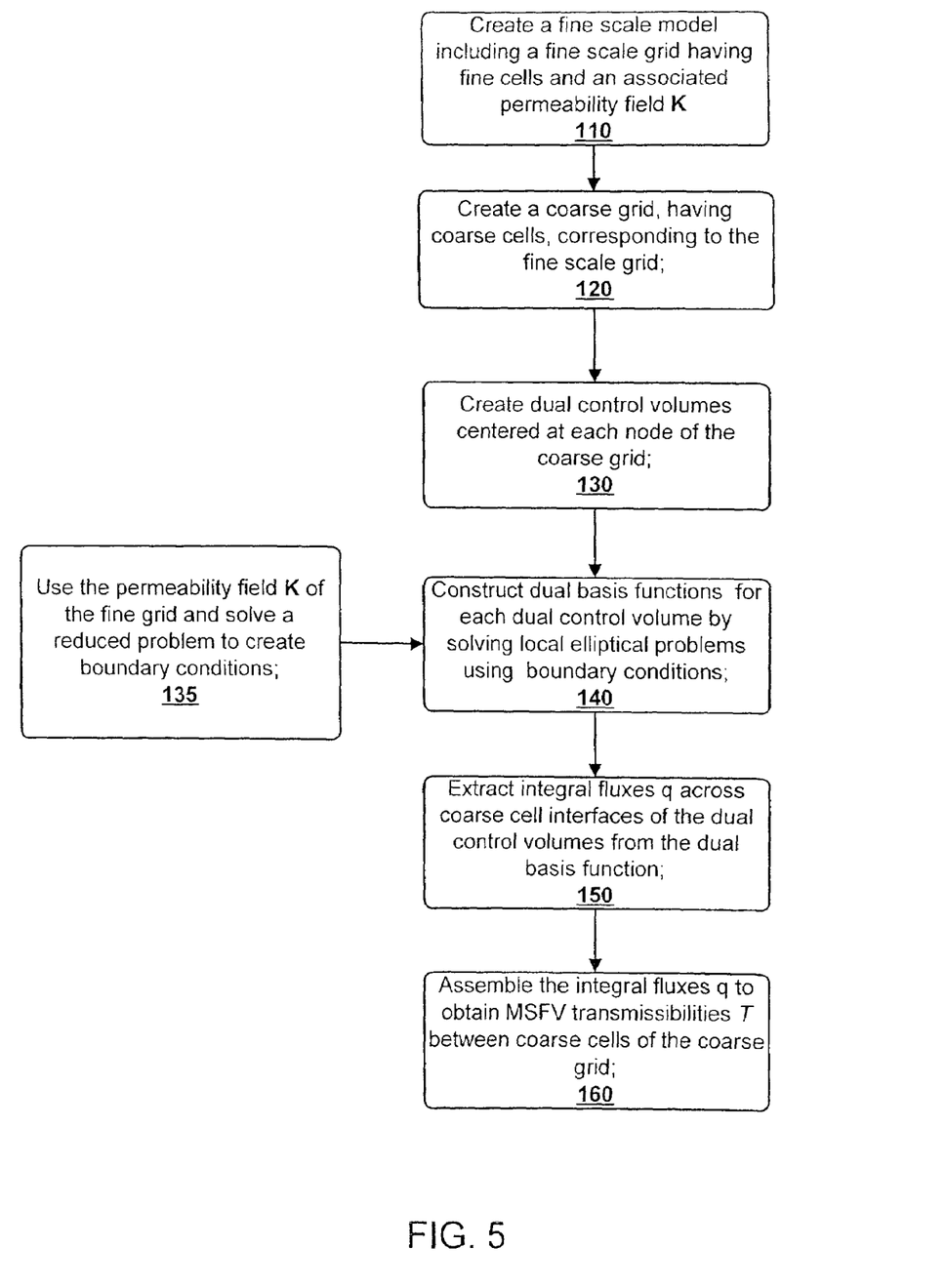
FIG. 5 is a flowchart further detailing steps used to determine transmissibilities T between coarse cells.

Referring now to FIG. 5, a flowchart describes the individual steps which are undertaken to compute the transmissibilities T for a coarse scale model. First, a fine-scale grid having fine cells with an associated permeability field K are created (step 110). Next, a coarse grid, having coarse cells corresponding to the fine-scale grid, is created (step 120). The fine and coarse grids are then passed into a transmissibility or T-module.

Dual coarse control volumes $\tilde{\Omega}$ are constructed (step 130), one for each node of the coarse grid. For each dual coarse control volume $\tilde{\Omega}$, dual or coarse scale basis functions $\Phi_{CS}$ are constructed (step 140) by solving local elliptic problems (equation (10)) for each volume $\tilde{\Omega}$. This local elliptic problem, as described in section II.A.2 above, and the permeability field K associated with the fine grid are used and the boundary conditions corresponding to equation (11) are utilized (step 135) in solving the elliptic problem. In cases where the fine and coarse grids are nonconforming (e.g., if unstructured grids are used), oversampling may be applied. Finally, the integral coarse scale fluxes q across the interfaces of the coarse cells are extracted (step 150) from the dual basis functions $\Phi$. These integral coarse scale fluxes q are then assembled (step 160) to obtain MSFV-transmissibilities T between grid cells of the coarse grid.

The computation of transmissibilities T can be viewed as an upscaling procedure. That is, the constructed coarse pressure solutions are designed to account for, in some manner, the fine-scale description of the permeability K in the original fine-scale grid model. Thus, part A—step 100—computing transmissibilities, is preferably a separate preprocessing step used to coarsen the original fine-scale model to a size manageable by a conventional reservoir simulator.

These transmissibilities T may be written to a file for later use. A finite-volume simulator that can handle multi-point flux discretization can then use these transmissibilities T.

B. Construction of Fine-Scale Basis Function and Fine-scale Velocity Field—Step 200

Figure 6:
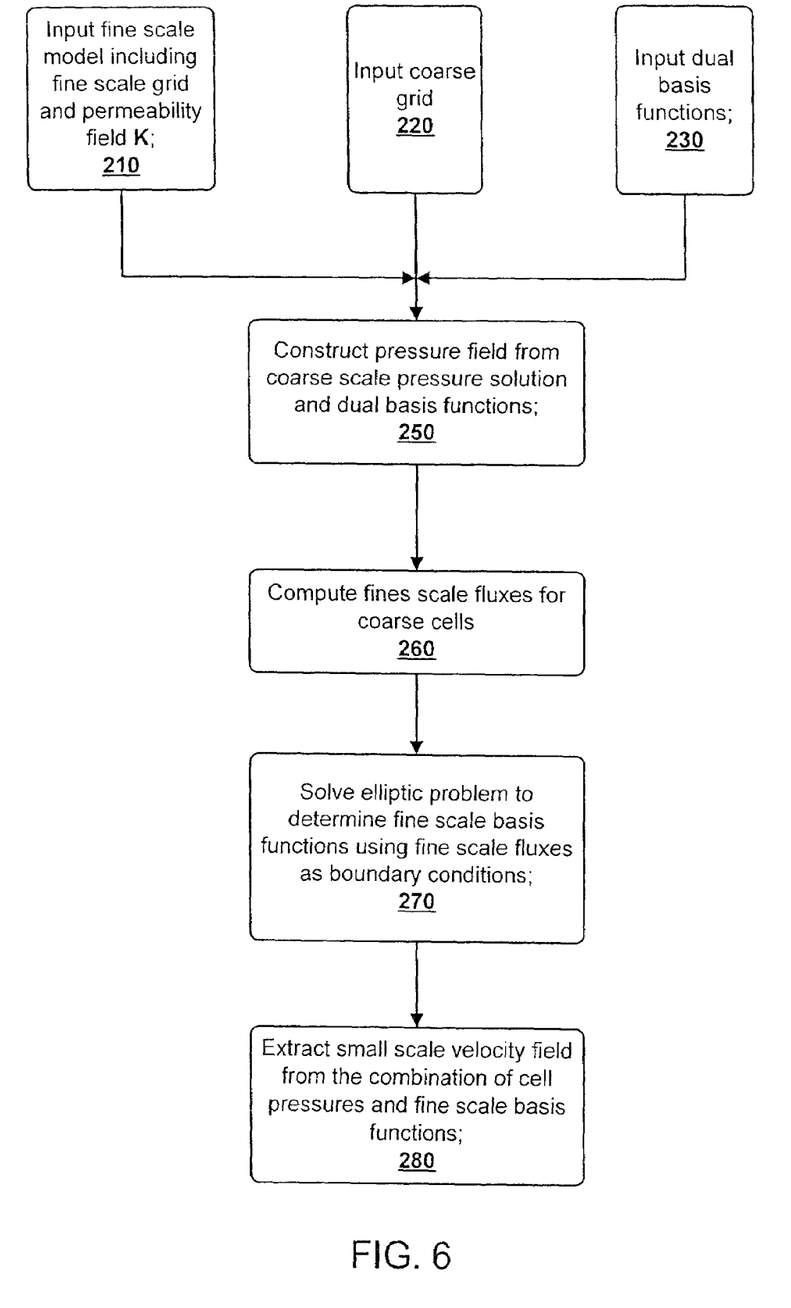
FIG. 6 is a flow chart further describing steps used to construct a set of fine-scale basis functions and to extract a fine-scale velocity field.

FIG. 6 is a flowchart describing the steps taken to construct a set of fine-scale basis functions $\Phi$ which can be isolated in a separate fine-scale basis function $\Phi$ module. These fine-scale basis functions $\Phi$ can then be used to create a fine-scale velocity field. This module is only necessary if there is an interest in reconstructing the fine-scale velocity field from the coarse pressure solution. As described in Section II.A.3 above, if the original dual basis functions $\Phi$ are used in reconstructing the fine-scale velocity field, large mass balance errors can occur. Here, steps are described to compute the fine-scale basis functions $\Phi$, which can be used to reconstruct a conservative fine-scale velocity field. The procedure (step 200) of FIG. 4 follows the description of Section II.A.3 and has to be performed only once at the beginning of a simulation and is well suited for parallel computation.

The fine-scale grid (step 210), with its corresponding permeability field K, the coarse grid (step 220), and the dual basis functions $\Phi$ (step 230) are passed into a fine-scale basis function $\Phi$. A pressure field is constructed from the coarse scale pressure solution and dual basis functions (step 250). The fine-scale fluxes for the coarse cells are then computed (step 260). For each control volume, elliptic problems are solved, using the fine-scale fluxes as boundary conditions, to determine fine-scale basis functions (step 270). The fine-scale velocity field can then be computed from the superposition of cell pressures and fine-scale basis functions. The results may then be output from the module. Alternatively, the fine-scale velocity field can be computed directly in place as has been described above in section II.A.3. In many cases, the fine-scale velocity field has to be reconstructed in certain regions only, as will be described in fuller detail below. Therefore, in order to save memory and computing time, one can think of an in situ computation of the fine-scale basis functions $\Phi$, which, once computed, can be reused.

C. Computation of the Coarse Solution at the New Time—Step 300

Step 300 can be performed by virtually any multi-point stencil finite-volume code by using the MSFV-transmissibilities T for the flux calculation. These coarse fluxes effectively capture the large-scale behavior of the solution without resolving the small scales.

D. Reconstruction of the Fine-Scale Velocity Field—Step 400

Step 400 is straight forward. Reconstruction of the fine-scale velocity field in regions of interest is achieved by superposition of the fine-scale basis FIG. 6. Alternatively, the fine-scale velocity field can be computed directly in functions $\Phi^i$ as described in section II.A.3, step B above and as shown in place as described above in section II.A.3. Of course, many variations of the MSFV method can be devised. It may be advantageous; however, that construction of the transmissibilities T and fine-scale basis functions $\Phi$ can be done in modules separate from the simulator.

E. Solving Pressure and Transport Equations

1. Numerical Solution Algorithm—Explicit Solution

Multi-phase flow problems may be solved in two stages. First, the total velocity field is obtained from solving the pressure equation (4), and then the hyperbolic transport equation (5) is solved. To solve the pressure equation, the MSFV method, which has been described above is used. The difference from single phase flow is that in this case the mobility term $\lambda$ reflects the total mobility of both phases, and then the obtained velocity field u is the total velocity in the domain. The reconstructed fine-scale velocity field u is then used to solve the transport equation on the fine grid. The values of $k_{o,w}$ are taken from the upwind direction; time integration may be obtained using a backward Euler scheme. Note that, in general, the dual and fine-scale basis functions ($\Phi, \Phi$) must be recomputed each time step due to changes in the saturation (mobility) field.

2. Numerical Solution Algorithm—Implicit Coupling

In the preferred embodiment of this invention, the MSFV method utilizes an algorithm with implicit calculations. The multi-phase flow problem is solved iteratively in two stages. See FIG. 7 for a diagram of this method illustrating the coupling between the pressure and saturation equations.

Figure 7:
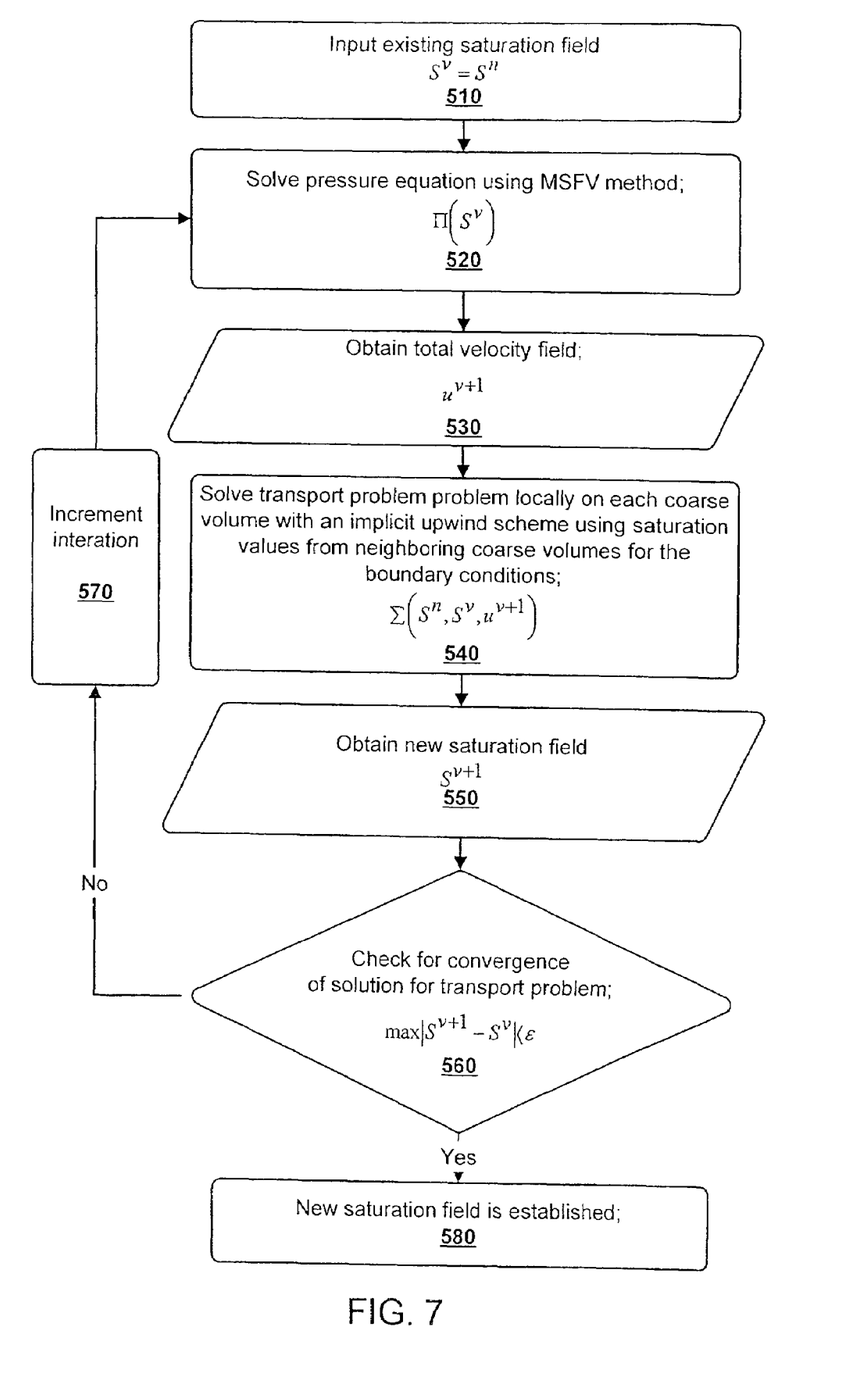
FIG. 7 is a flowchart depicting coupling between pressure and the saturation equations which utilize an implicit solution scheme and wherein $\pi$ and $\Sigma$ are operators used to update total velocity and saturation, respectively, during a single time step.

First, in each Newton step, a saturation field S is established—either initial input or through iteration (step 510). Next, a pressure equation (see equation (19) below) is solved (step 520) using the MSFV techniques described above to obtain (step 530) the total velocity field. Then a transport equation (see equation (20) below) is solved (step 540) on the fine grid by using the reconstructed fine-scale velocity field u. In this solution, a Schwarz overlap technique is applied, i.e., the transport problem is solved locally on each coarse volume with an implicit upwind scheme, where the saturation values from the neighboring coarse volumes at the previous iteration level are used for the boundary conditions. Once the Schwarz overlap scheme has converged (steps 550, 560)—for hyperbolic systems this method is very efficient—the new saturation distribution determines the new total mobility field for the pressure problem of the next Newton iteration. Note that, in general, some of the basis functions have to be recomputed each iteration.

The superscripts n and $\nu$ denote the old time and iteration levels, respectively. Saturation is represented by S, the total velocity field by u, the computation of the velocity by the operator $\pi$, and the computation of the saturation by $\Sigma$. The new pressure field $p^{\nu+1}$ is obtained by solving $$\nabla \cdot (k(k_o(S^\nu) + k_w(S^\nu)\nabla p^{\nu+1}) = q_o + q_w, \qquad (19)$$

from which the new velocity field $u^{\nu+1}$ is computed. The new saturation field $S^{\nu+1}$ is obtained by solving $$\Phi \frac{S^{\nu+1} - S^n}{\Delta t} + \nabla \cdot \left( \frac{k_o(S^{\nu+1})}{k_o(S^{\nu+1}) + k_w(S^{\nu+1})} u^{\nu+1} \right) = -q_o \qquad (20)$$

Figure 8:
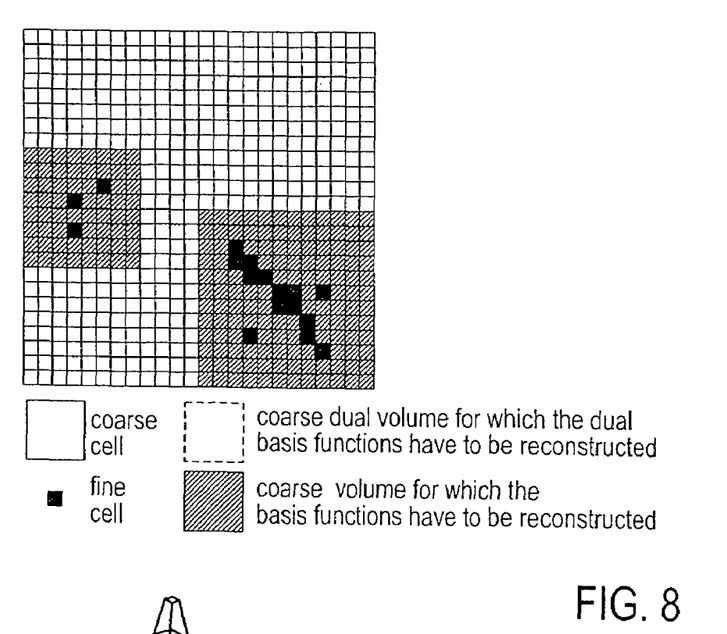
FIG. 8 is an illustration of the use of an adaptive scheme to selectively update basis functions.

F. Recomputing Transmissibilities and Fine-Scale Basis Functions—Adaptive Scheme The most expensive part of the MSFV algorithm for multi-phase flow is the reconstruction of the coarse scale and fine-scale basis functions ($\Phi, \Phi$). Therefore, to obtain higher efficiency, it is desirable to recompute the basis functions only where it is absolutely necessary. An adaptive scheme can be used to update these basis functions. In the preferred exemplary embodiment, if the condition $$\frac{1}{1+\epsilon_\lambda} < \frac{\lambda^n}{\lambda^{n-1}} < (1+\epsilon_\lambda) \qquad (23)$$

is not fulfilled (the superscripts n and n−1 denote the previous two time steps and $\epsilon_\lambda$ is a defined value) for all fine cells inside a coarse dual volume, then the dual basis functions of that control volume have to be reconstructed. Note that condition (23) is true if $\lambda$ changes by a factor which is larger than $1/(1+\epsilon_{80})$ and smaller than $1+\epsilon_\lambda$. An illustration of this scheme is shown in FIG. 8, where the fine and the coarse grid cells are drawn with thin and bold lines, respectively. The black squares represent the fine cells in which condition (23) is not fulfilled. The squares with bold dashed lines are the control volumes for which the dual basis functions have to be reconstructed. The shaded regions represent the coarse cells for which the fine-scale basis functions have to be updated. In the schematic 2D example of FIG. 8, only 20 of 196 total dual basis functions and 117 of 324 total fine-scale basis functions have to be reconstructed. Of course, these numbers depend heavily on the defined threshold $\epsilon_\lambda$. In general, a smaller threshold triggers more fine volumes, and as a consequence more basis functions are recomputed each time step. For a wide variety of test cases, it has been found that taking $\epsilon_{80}$ to be <0.2 yields marginal changes in the obtained results.

IV. Numerical Results

This MSFV method, combined the implicit coupling scheme shown in FIG. 7, has been tested for two phase flow ($\mu_o/\mu_w$=10) in a stiff 3D model with more than 140,000 fine cells. It has been demonstrated that the multi-scale results are in excellent agreement with the fine-scale solution. Moreover, the MSFV method has proven to be approximately 27 times more efficient than the established oil reservoir simulator Chears. However, in many cases the computational efficiency is compromised due to the time step size restrictions inherent for IMPES schemes. This problem may be resolved by applying the fully implicit MSFV method, which was described in the previous section. Here numerical studies show the following:

(1) The results obtained with the implicit MSFV method are in excellent agreement with the fine-scale results.
(2) The results obtained with the implicit MSFV method are not very sensitive to the choice of the coarse grid.
(3) The implicit MSFV for two phase flow overcomes the time step size restriction and therefore very large time steps can be applied.
(4) The results obtained with the implicit MSFV method are, to a large extent, insensitive to the time step size.
(5) The implicit MSFV method is very efficient.

For the fine-scale comparison runs, the established reservoir simulator Chears was used. The efficiency of both the implicit MSFV method and the fine-scale reservoir simulator depends on the choice of various parameter settings which were not fully optimized.

A. Test Case

Figure 9:
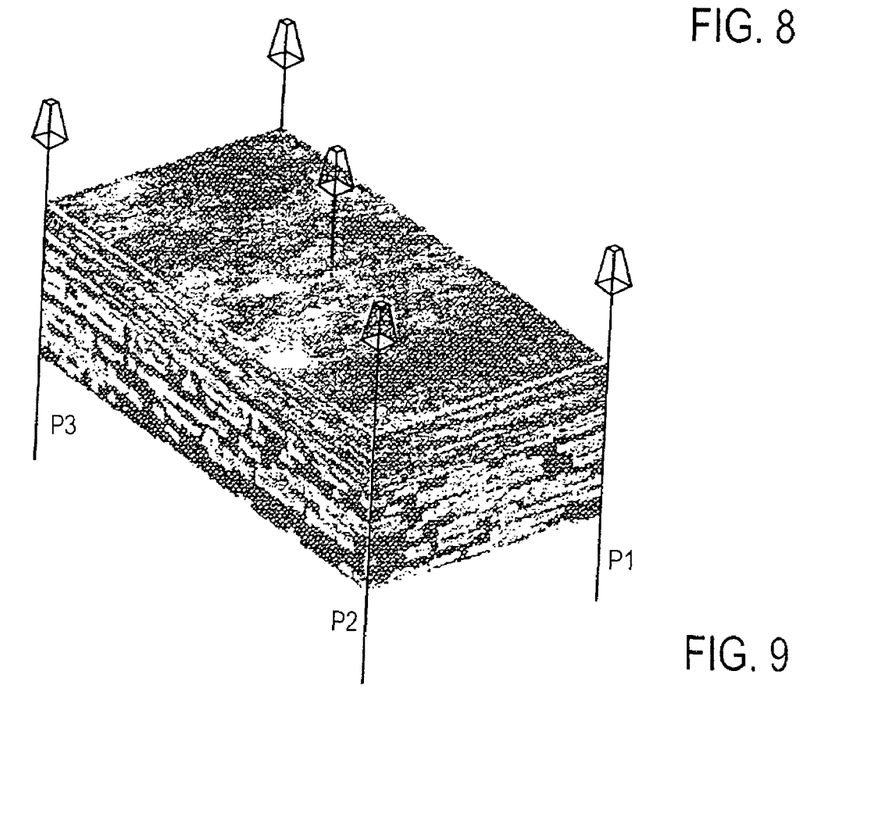
FIG. 9 is an illustration of a permeability field associated with a SPE 10 problem.

To study the accuracy and efficiency of the fully implicit MSFV algorithm, 2D and 3D test cases with uniformly spaced orthogonal 60×220 and 60×220×85 grids were used. The 3D grid and permeability field are the same as for the SPE 10 test case, which is regarded as being extremely difficult for reservoir simulators. While this 3D test case is used for computational efficiency assessment, the 2D test cases, which consist of top and bottom layers, serves to study the accuracy of the MSFV method. FIG. 9 illustrates the 3D test case posed by the permeability field of the SPE 10 problem. The darker areas indicate lower permeability. An injector well is placed in the center of the field and four producers in the corners. These well locations are used for all of the following studies. The reservoir is initially filled with oil and $\mu_o/\mu_w$=10 and $k_{r_{o,w}} = S_{o,w}^2$.

B. 2D Simulation of the Top and Bottom Layers

Figure 10A:
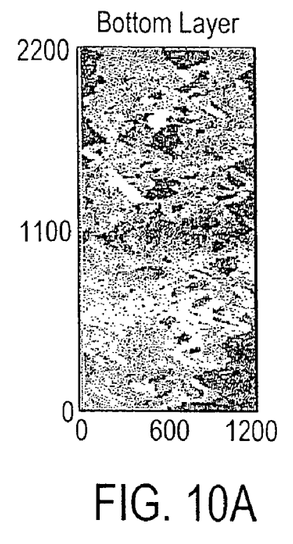
FIGS. 10A-B are illustrations of permeability fields of a top layer and a bottom layer of cells from the SPE 10 problem.
Figure 10B:
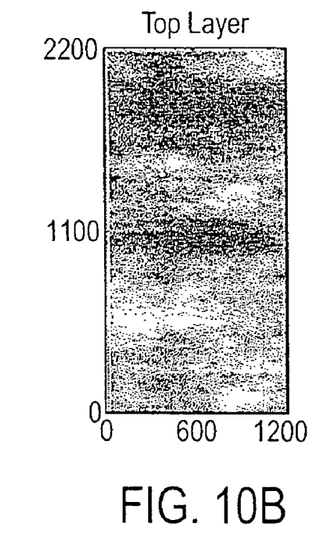

The MSFV simulator used lacked a sophisticated well model. That is, wells are modeled by defining the total rates for each perforated coarse volume. Therefore, in order to make accuracy comparisons between MSFV and fine-scale (Chears reservoir simulator) results, each fine-scale volume inside each perforated coarse volume becomes a well in the Chears runs. For large 3D models, this poses a technical problem since Chears reservoir simulator is not designed to handle an arbitrary large number of individual wells. For this reason, it was determined to do an accuracy assessment in 2D, i.e., with the top and the bottom layers of the 3D model. These two layers, for which the permeability fields are shown in FIGS. 10A and 10B, are representative for the two characteristically different regions of the full model.

Figure 11A:
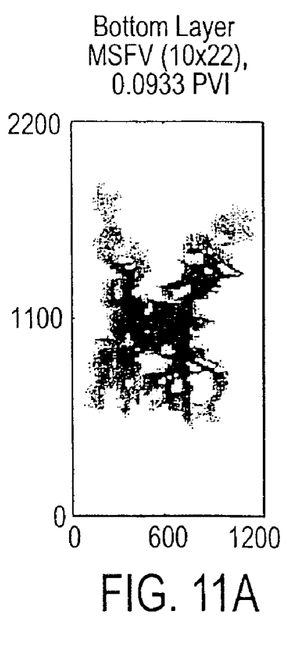
FIGS. 11A-B are illustrations of saturation fields of top layers of cells created using the MSFV method and FIG. 11C is an illustration of a saturation field computed by a conventional fine-scale reservoir simulator.
Figure 11B:
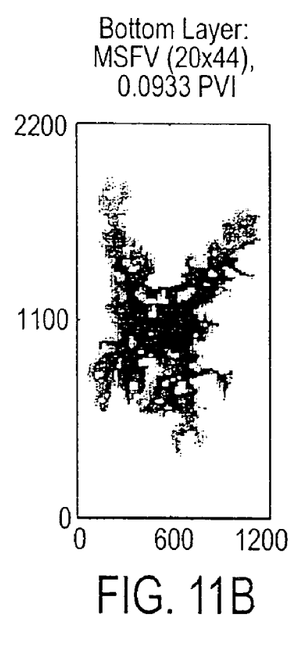
Figure 11C:
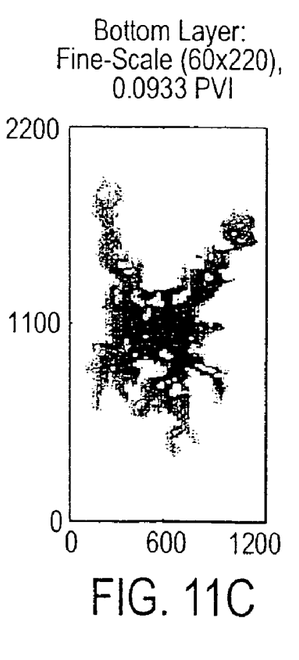
Figure 12A:
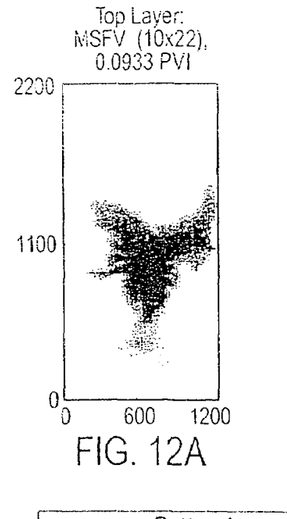
FIGS. 12A-B are illustrations of saturation fields of bottom layers of cells created using the MSFV method and FIG. 12C is an illustration of a saturation field computed by a conventional fine-scale reservoir computer.
Figure 12B:
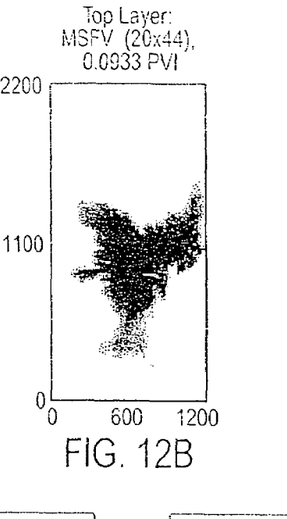
Figure 12C:
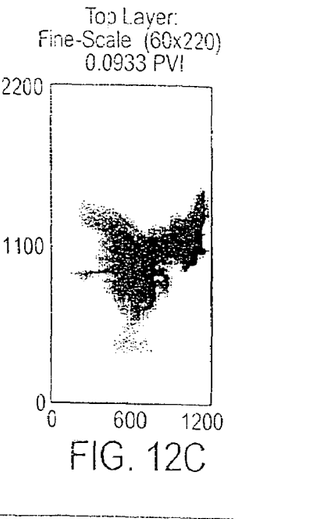
Figure 13A:
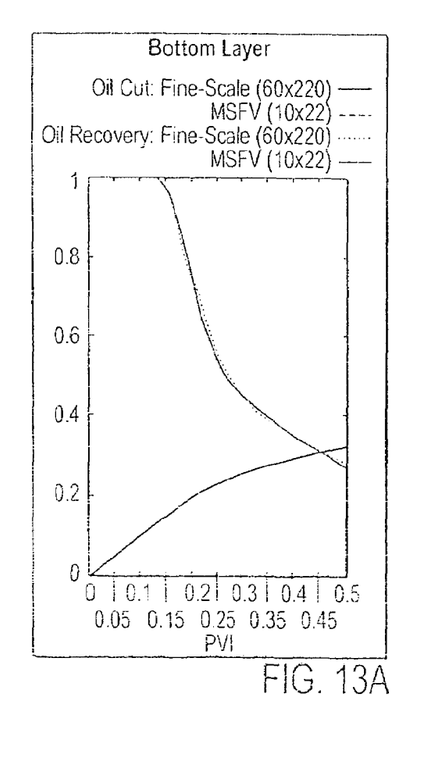
FIGS. 13A-B are graphs of oil cut and oil recovery.
Figure 13B:
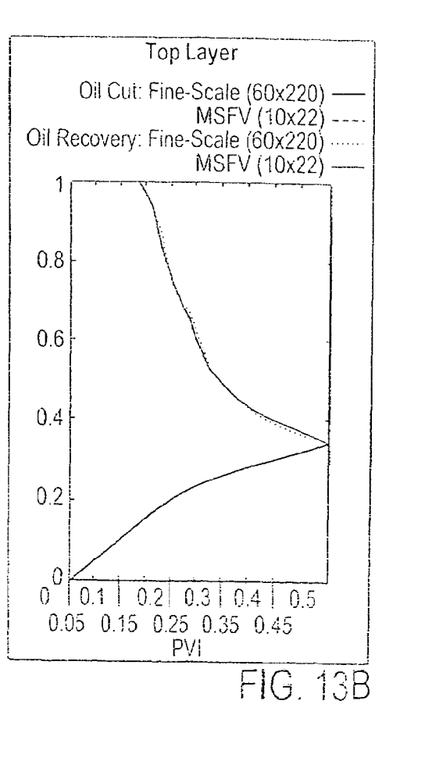

MSFV simulations were performed with uniformly spaced 10×22 and 20×44 coarse grids. The results were compared with the fine-scale solution on a 60×220 grid. As in the full 3D test case, there are four producers at the corners which are distributed over an area of 6×10 fine-scale volumes. The injector is located in the center of the domain and is distributed over an area of 12×12 fine-scale volumes. The rates are the same for all fine-scale volumes (positive for the producer volumes and negative for the injector volumes). FIGS. 11A-C and 12A-C show the permeability fields of the respective top and the bottom layers. The black is indicative of low permeability. These two layers are representative for the two characteristically different regions of the full 3D model. FIGS. 11A-C and 12A-C show the computed saturation fields after 0.0933 PVI (pore volume injected) for the top and the bottom layers, respectively. While FIGS. 11C and 12C show the fine-scale reference solutions, FIGS. 11A and 11B and 12A and 12B show the MSFV results for 10×22 and 20×44 coarse grids, respectively. For both layers, it can be observed that the agreement is excellent and that the multi-scale method is hardly sensitive to the choice of the coarse grid. A more quantitative comparison is shown in FIGS. 13A and 13B where the fine-scale and multi-scale oil cut and oil recovery curves are plotted. Considering the difficulty of these test problems and the fact that two independently implemented simulators are used for the comparisons, this agreement is quite good. In the following studies, it will be demonstrated that for a model with 1,122,000 cells, the MSFV method is significantly more efficient than fine-scale simulations and the results remain accurate for very large time steps.

C. 3D Simulations

Figure 14:
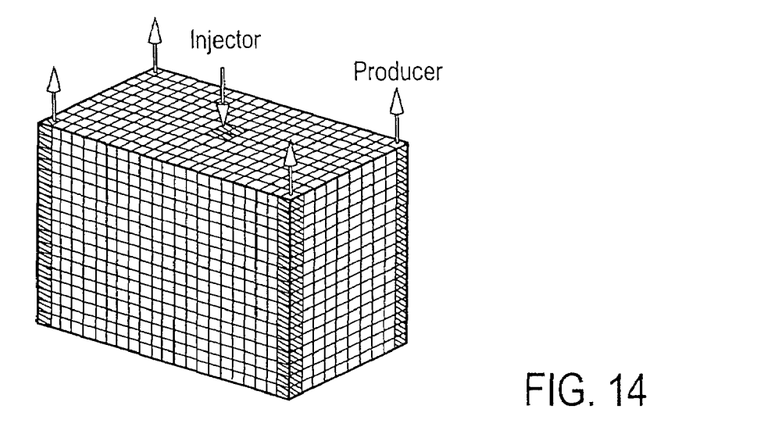
FIG. 14 is an illustration of a 3D test case having a grid of 10×22×17 grid cells and including injector and producer wells.

While 2D studies are appropriate to study the accuracy of the implicit MSFV method, large and stiff 3D computations are required for a meaningful efficiency assessment. A 3D test case was employed as described above. A coarse 10×22×17 grid, shown in FIG. 14, was used and 0.5 pore volumes were injected. Opposed to the MSFV runs, the wells for the CHEARS simulations were defined on the fine-scale. Table 1 below shows CPU time and required number of times steps for the CHEARS simulation and two MSFV runs.

TABLE 1

Efficiency Comparison Between Msfv And Fine-Scale Simulations

| Simulator | CPU TIME (minutes) | Time steps | Recomputed Basis Functions (%) | Coarse Pressure Computations (%) |
|---|---|---|---|---|
| Chears | 3325 | 790 | | |
| MSFV | 297 | 200 | 10 | 98 |
| MSFV | 123 | 50 | 26 | 100 |

Figure 15:
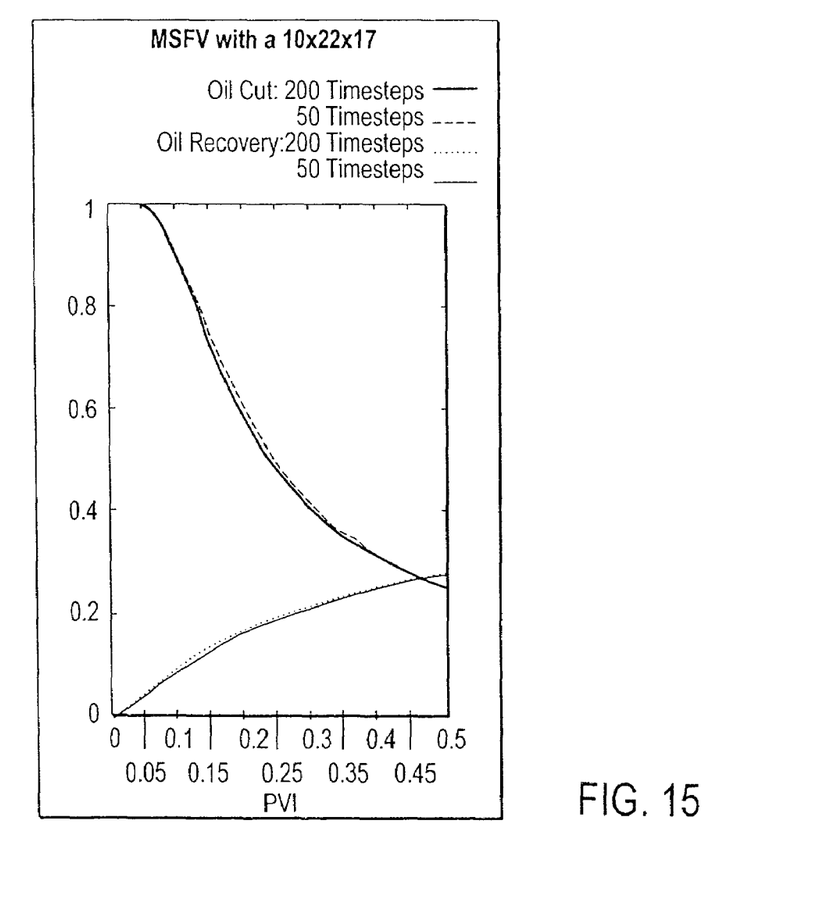
FIG. 15 is a graph of oil cut and oil recovery.

While Chears uses a control algorithm, the time step size in the multi-scale simulations was fixed. It is due to the size and stiffness of the problem that much smaller time steps have to be applied for a successful Chears simulation. The table shows that the implicit MSFV method can compute the solution approximately 27 times faster than CHEARS. FIG. 15 shows the oil cut and recovery curves obtained with multi-scale simulations using 50 and 200 time steps. The close agreement between the results confirms that the method is very robust in respect to time step size. Since the cost for MSFV simulation scales almost linearly with the problem size and since the dual and fine-scale basis function can be computed independently, the method is ideally suited for massive parallel computations and huge problems.

While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A multi-scale computer implemented method for use in modeling a subsurface reservoir comprising:
   (a) creating a fine grid defining a plurality of fine cells and having a permeability field associated with the fine cells;
   (b) creating a coarse grid defining a plurality of coarse cells having interfaces between the coarse cells, the coarse cells being aggregates of the fine cells;
   (c) creating a dual coarse grid defining a plurality of dual coarse control volumes, the dual coarse control volumes being aggregates of the fine cells and having boundaries bounding the dual coarse control volumes;
   (d) calculating dual basis functions on the dual coarse control volumes by solving local elliptic or parabolic problems;
   (e) extracting fluxes across the interfaces of the coarse cells from the dual basis functions;
   (f) assembling the fluxes to calculate effective transmissibilities between coarse cells;
   (g) calculating pressure in the coarse cells using a finite volume method and utilizing the effective transmissibilities between coarse cells; and
   (h) computing a fine-scale velocity field responsive to the calculated pressure in the coarse cells for use as a variable in modeling fluid flow in the subsurface reservoir with a subsurface reservoir simulator, the fine-scale velocity field being computed directly in place and including the steps:
      (i) computing fine-scale fluxes across the coarse cell interfaces using the dual basis functions with the calculated pressures in the coarse cells;
      (ii) solving a pressure equation on each of the coarse cells using the fine-scale fluxes computed in step (i) as boundary conditions to obtain fine-scale pressures; and
      (iii) computing the fine-scale velocity field from Darcy's law using the fine-scale pressures obtained in step (ii).

2. The method of claim 1 wherein:
   the solving of the pressure equation of step (ii) to obtain fine-scale pressures is performed on a system with larger support.

3. The method of claim 2 wherein:
   the solving of the pressure equation of step (ii) may be performed by over-sampling around the coarse cells.

4. The method of claim 1 wherein step (c) further comprises offsetting the dual coarse grid from the coarse grid such that the boundaries of the dual coarse control volumes are located within boundaries of the coarse grid cells.

5. The method of claim 4 wherein an intersection of the boundaries of four adjacent dual coarse control volumes is located in the center of one of the coarse grid cells.

6. The method of claim 5 wherein the center of each of the dual coarse control volumes is the location for an intersection of four adjacent coarse grid cells.

7. The method of claim 4 wherein:
   the fine scale grid created in step (a) is a three dimensional grid; and
   an intersection of the boundaries of eight adjacent dual coarse control volumes is located in the center of one of the coarse grid cells.

8. The method of claim 7 wherein the center of each of the dual coarse control volumes is the location for an intersection of eight adjacent coarse grid cells.

9. The method of claim 1 wherein step (c) further comprises locating an intersection of the boundaries of four adjacent dual coarse control volumes in the center of one of the coarse grid cells.

10. The method of claim 9 wherein the center of each of the dual coarse control volumes is the location for an intersection of four adjacent coarse grid cells.

11. The method of claim 1 wherein in steps (b) and (c), each of the fine cells are associated with at least one of the coarse grid cells and at least one of the dual coarse control volumes.

12. The method of claim 1 wherein in steps (b) and (c), each fine cell of the plurality of fine cells is associated with at least one of the coarse grid cells and at least one of the dual coarse control volumes such that overlapping coarse grid cells and dual coarse control volumes contain therewithin at least some of the same fine cells.

13. The method of claim 1 wherein:
   the fine scale grid created in step (a) is a two-dimensional grid; and
   step (c) further comprises forming each dual coarse control volume by connecting mid-points of four adjacent coarse cells.

* * * * *